May 24, 1955 R. O. STUELAND 2,709,085
MULTIPLE IMPLEMENT HITCH
Filed Nov. 9, 1951 3 Sheets-Sheet 2
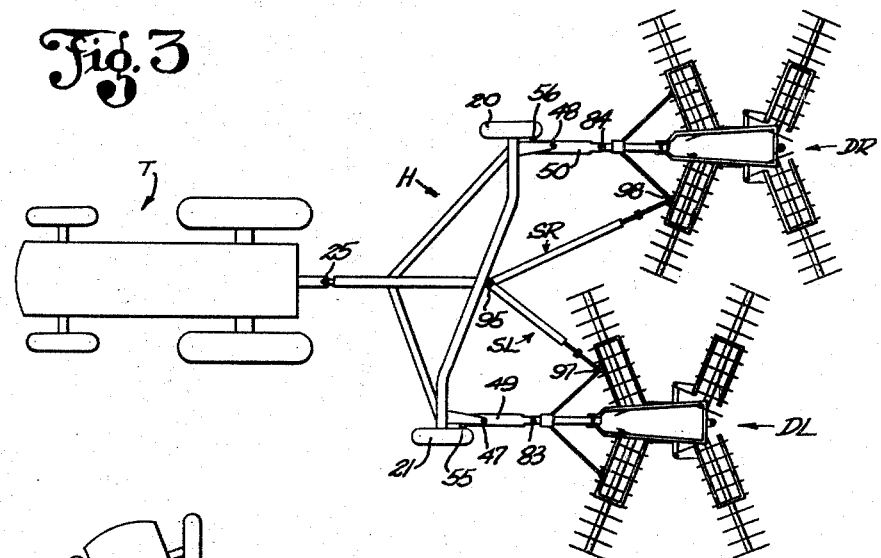
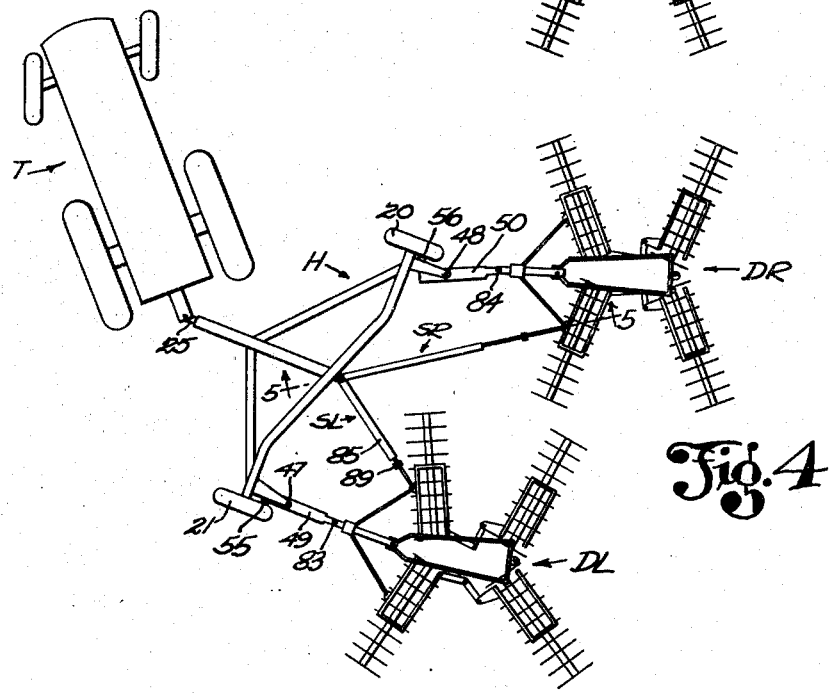
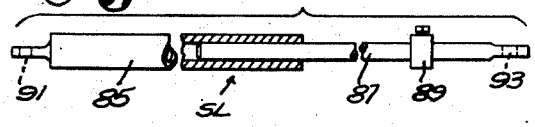
INVENTOR.
R. O. Stueland
By Edgar Herlich
Atty.

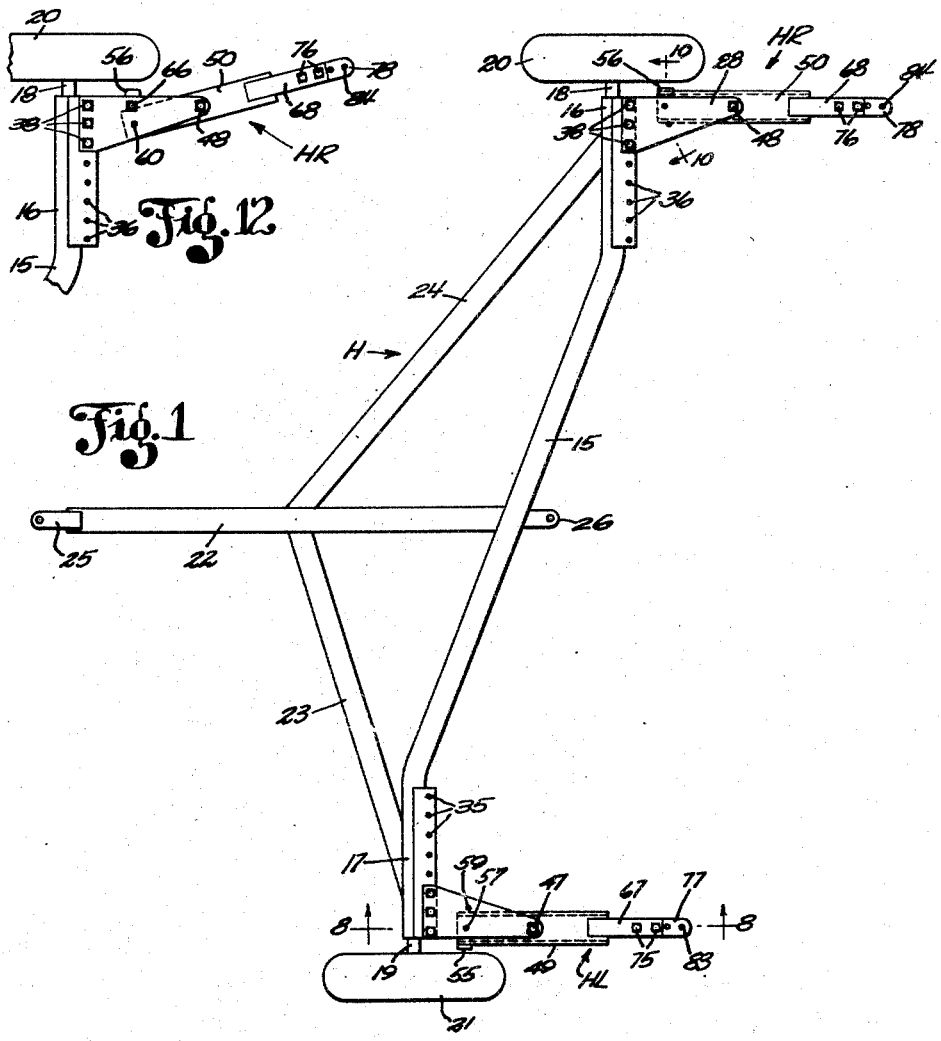

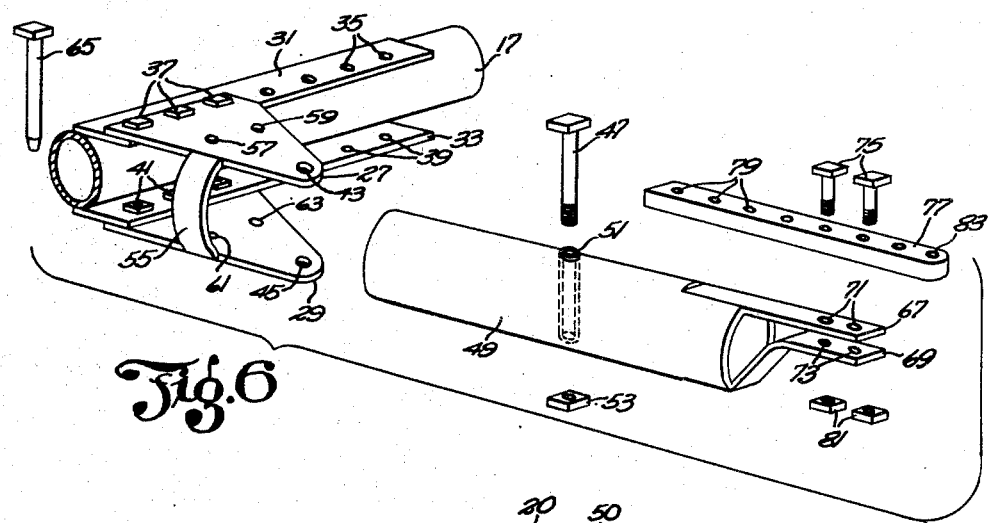

United States Patent Office 2,709,085
Patented May 24, 1955

2,709,085

MULTIPLE IMPLEMENT HITCH

Richard O. Stueland, Clarkfield, Minn.

Application November 9, 1951, Serial No. 255,706

14 Claims. (Cl. 280—412)

My invention relates to a multiple implement hitch and more particularly to a mobile hitch for enabling a tractor to draw several implements.

It is conventional practice in large scale farming operations to use a relatively powerful tractor for drawing at least a pair of implements, such as disk harrows, grain drills, etc., in side by side relationship so as to cover a larger area of the ground in each pass over the field. The means by which the implements are hitched to the tractor commonly comprises a relatively wide hitch frame having a single draft connection to the tractor and a pair of separate draft connections, one for each implement. Because of the width of the hitch frame, the frame is provided with its own carrying wheels.

Various problems arise in the use of a tractor-implement train of this character. For example, in the conventional hitch wherein the wheels of the hitch frame are coaxial, a longer draft connection must be provided for one trailing implement than for the other, because the implements must be offset from front to rear so that their inner portions do not conflict during travel, particularly on turns. Because of the increased length of one of these draft connections, vertical movement of the hitch frame at that side when uneven ground is encountered is reflected in increased vertical movement of the respective implement, which is undesirable. According to the present invention, the wheels of the hitch frame are offset fore and aft so that the hitch members for the implements can be made of equal length, thus enabling each implement to be relatively closely coupled with respect to the proximate wheel of the hitch frame. Another problem that occurs more often than not is interference of the implements with each other on turns, occasioned in part by lack of control heretofore for the implements and by the difference in length of the implement hitch members. In my improved hitch, swinging of the hitch members is limited so that these members can swing outwardly only, thus preventing the implements from moving inwardly and interfering with each other on turns.

Another advantage of the fore and aft offset wheels is that the hitch has a greater tendency to follow the tractor in a straight line; and, although steering of the hitch may be a little more difficult, the tractor has sufficient power and the tendency of the hitch to remain in a straight line prevents the hitch from pivoting on one wheel or the other on turns, which pivoting has heretofore contributed materially to the overlapping or interference between the implements.

Other features of the invention include vertical adjustability of the hitch points merely by turning the hitch members over; further adjustability of the entire hitch can be achieved by turning the entire hitch over; lateral adjustment of the hitch points is provided for accommodating different types and sizes of trailing implements; means is provided for locking the hitch members against swinging; and means is provided for setting the initial position of each hitch member, from which position the hitch member may swing only outwardly.

There are many other features inherent in my invention, as will appear from the annexed description and drawings, wherein:

Figure 1 is a plan view of the hitch by itself.

Figure 2 is a side view of the hitch.

Figure 3 is a plan view, on a reduced scale, showing the hitch connected between a tractor and a pair of disk harrows.

Figure 4 illustrates the arrangement of Figure 3 when making a turn.

Figure 5 is an enlarged sectional view as seen substantially on the line 5—5 of Figure 4.

Figure 6 is an exploded perspective view, on an enlarged scale, showing the assembly details of one of the hitch members.

Figure 7 is a view of the arrangement of Figure 3, but showing the tractor, hitch and implements in transport relationship.

Figure 8 is an enlarged sectional view as seen on the line 8—8 of Figure 1.

Figure 9 is a section on the line 9—9 of Figure 8.

Figure 10 is an enlarged section on the line 10—10 of Figure 1.

Figure 11 is a fragmentary plan view showing certain of the types of adjustment that can be had with a hitch member.

Figure 12 is a similar view showing another type of adjustment.

I have chosen for illustration only an arrangement in which a preferred embodiment of my hitch, designated generally by the letter H, is used with a wheel tractor T for drawing a pair of implements, here disk harrows DR and DL (Figures 3 and 4). Of course, other implements, such as grain drills, for example, can be used with my hitch. Also, other types of tractors of requisite power could be used as the traction or propelling means. All of these would constitute conventional or obvious variations to one having before him the principles of the invention as taught herein. Hence, the present disclosure should be considered representative and not as excluding such modifications or as otherwise limiting the appended claims.

Figure 1 shows the hitch by itself as comprising a relatively wide frame made up of an elongated frame bar 15 having opposite right and left hand ends 16 and 17 and having its relatively long intermediate portion disposed diagonally as respects the intended line of travel of the hitch, resulting in a non-coaxial or fore and aft offset relationship between the end portions 16 and 17. The end portion 16 has a stub axle 18 on which is journaled a wheel 20. The axle 19 and wheel 21 are provided at the other end 17. The frame structure or body of the hitch is completed by a forwardly extending draft member 22, which is perpendicular to the rolling axes of the wheels 20 and 21, and by a pair of diagonal braces 23 and 24 rigidly secured respectively between opposite sides of the draft member 22 and the end portions 16 and 17. The frame structure is preferably a welded assembly throughout, except at articulated joints; although, any other suitable arrangement could be used. Considering the entire frame structure 15—22—23—24 as a whole, it may be considered relatively wide and having right and left hand sides. The hitch will be hereinafter referred to in such manner and not with reference to opposite ends of the elongated frame bar 15.

The front end of the draft member 22 is provided with a clevis 25 by means of which a conventional connection may be made to the tractor T. The frame bar 15 is provided centrally thereof with an apertured ear 26 by means of which an implement may be centrally connected, as for transport as shown in Figure 7.

The main hitch frame includes right and left hand implement hitch assemblies designated generally as HR and HL respectively.

The left hand assembly HL (Figure 6) comprises upper and lower plates 27 and 29 connected for lateral adjustment respectively to upper and lower plates 31 and 33 which are rigidly secured as by welding to the left hand side or end of the hitch frame. The upper plate 31 has a plurality of apertures 35, any three of which may selectively receive bolts 37 for adjustably positioning the plate 27. The adjustability between the lower plate 33 and lower hitch plate 29 is accomplished by a plurality of apertures 39 in the former and a plurality of bolts 41.

Similar structure is provided in the right hand assembly HR, wherein corresponding parts, to the extent shown, bear even reference numerals.

The hitch plates 27 and 29 are apertured in vertical alinement at 43 and 45 respectively to receive an upright pivot bolt 47 for pivotally connecting between the plates 27 and 29 an elongated hitch member 49, which member is preferably tubular and has a vertical bushing 51 between diametrically opposed walls for receiving the pivot bolt 47. A nut 53 completes the pivot assembly. The hitch plates 27 and 29 are joined at their outer edges by stop or limit means comprising an arcuate member 55 preferably welded at its opposite ends to the hitch plates. The member 55 is in position to engage the hitch member 49 so that the latter can swing in only one direction. Stated otherwise, the arrangement is such that the rear end of the hitch member can swing laterally outwardly only.

The plate 27 has a second pair of apertures 57 and 59 which register respectively with apertures 61 and 63 in the lower hitch plate 29. Selected alined apertures 57—61 or 59—63 may receive a locking pin 65 for locking the hitch member 49 against swinging or for providing an additional stop complementary to that provided by the member 55. The former position of adjustment or use of a pin 66 in the right hand hitch assembly is shown in Figure 10, locking the hitch member 50. The latter position is shown in Figure 12, wherein the pin 66 provides a stop inwardly of a stop member 56. (At this point, it should be remembered that the components of the right hand assembly will not be specifically described as long as their symmetrical counterparts appear in the left hand assembly, and the former will be identified merely by the use of even reference numerals.)

The rear end of the hitch member 49 is provided with upper and lower straps 67 and 69 apertured respectively at 71 and 73 to receive bolts 75 for adjustably securing in place an elongated hitch bar 77 provided with longitudinally spaced apertures 79. Any selected adjacent pair of apertures 79 may be registered with the apertures 71 and 73 to receive the securing bolts 75 (which receive nuts 81) for securing various longitudinal positions of adjustment of the hitch bar 77 relative to the hitch member 49. The last or rearwardmost hole 83 of the hitch bar 77 provides a hitch point for connection to the draft tongue of the disk harrow DL. The manner in which the hitch member 49 (50) is cut out or notched to receive the straps 67 and 69 (68 and 70) is illustrated in Figures 6 and 9. Again, welding is preferably used as the securing method.

When the hitch arrangement is used with the tractor T and the disk harrows DR and DL, the setup for straight ahead travel is as shown in Figure 3. The disk harrow DR is connected at 84 (the hitch point at the right side corresponding to the hitch point 83 at the left side) so that it trails substantially directly behind the wheel 20. The disk harrow DL is connected at 83 to the hitch member 49 so as to trail substantially directly behind the left hand wheel 21. The hitch members 49 and 50 are of equal length and the adjustment of the right hand hitch bar 78 relative to the hitch member 50 corresponds to the adjustment between the left hand hitch bar 77 and left hand hitch member 49, whereby the fore and aft offset of the hitch points 83 and 84 is the same as the fore and aft offset of the rolling axes of the wheels 20 and 21. This enables the disk harrows DR and DL to be correspondingly offset and each disk harrow is relatively closely coupled with respect to the wheel at its side of the hitch H. There is thus eliminated the need for providing one hitch member longer than the other, which has among other disadvantages that involving excessive vertical deflection should the wheel at its side of the hitch drop into a hole or raise abruptly over a hummock. In the same manner, vertical deflection of the hitch because of vertical deflection of the tractor is not reflected in the implements to an excessive extent as heretofore occurred.

The apertured ear 26 centrally at the rear of the hitch H may be used as shown in Figures 3 and 4 for the connection of right and left hand stabilizers SR and SL, these being respectively connected to the inner gangs of the disk harrows DR and DL. Details of the left hand stabilizer appear in Figure 5, wherein it will be seen that there is a tubular forward part 85 and a rear part 87 in the form of a rod equipped with an adjustable collar 89. The parts 85 and 89 are respectively apertured at 91 and 93 to receive suitable pins 95 and 97. The pin 95 is common to both stabilizers and the right hand stabilizer utilizes a third pin 98 for connection to the right hand disk harrow DR.

I am depending largely upon the drawings to illustrate the operational characteristics of the tractor-hitch-implements train and in the interests of brevity prefer to omit description of things that I think should be perfectly obvious to those versed in the art. However, a few points are deemed to bear emphasis. For example, with the setup as shown in Figure 3, the disk harrows DR and DL trail in fore and aft offset relationship respectively behind the hitch members 50 and 49 and the innermost disks do not overlap, thus avoiding what is known as ridging. On a right hand turn as shown in Figure 4 there is a tendency for the harrow DL to swing inwardly about the pivot 47, but this is prevented by the stop 55. The tendency of the harrow DR to run straight ahead keeps it outwardly from the inner disks of the harrow DL and the tendency of the hitch H to run straight ahead causes it to delay on the turn so that it actually pulls the harrow DL almost ahead of the harrow DR, this being a result of the offset wheels 20 and 21 and of the limited swingability of the hitch members 49 and 50. It will be noted in Figure 4 that the relative movement between the hitch member 50 and the hitch H is such that the hitch point 84 is laterally outwardly of its original relative position. Thus there is no conflict between the harrows on the turn. The stabilizers prevent accidental inward swinging of the harrow DL, as shown by the proximity of the end of the forward part 85 to the adjustable collar 89. Under ideal conditions the stabilizers could be omitted, but variations in ground conditions almost require their use.

As stated above, the equal lengths of the hitch members 50 and 49 minimize digging in or extreme elevation of the implements as the wheels encounter uneven ground contour, since the vertical deflection will be more nearly that of the wheels and will not be magnified by extremely long hitch members.

In the use of the hitch with grain drills, for example, some overlapping of the inner portions of the drills is desirable. Hence, the hitch plates 27—29 (28—30) may be set inwardly (Figure 11). If a wider spacing between the hitch points 83 and 84 is required, the pin 66 may be utilized to set the angle of the hitch member 50 (also Figure 11). The pin 66 could be inserted through the aperture 58 and could give another adjustment of angle. Figure 10 shows, as stated above, locking of the hitch member against swinging in either direction, in the event that rigid hitch members 49 and 50 are desired.

On the whole, the hitch has great flexibility and is easily accommodated to various types of implements. Although grain drills have not been illustrated, the use thereof in connection with conventional mobile hitches will readily suggest their use with my improved hitch.

As will be evident from Figure 2, the entire hitch may be turned upsidedown, thus changing the level of the clevis 58 and hitch bars 77 and 78. Also, either hitch member 49 or 50 may be turned upsidedown to give a different level for its hitch bar. Longitudinal adjustment of the hitch bars is permitted, as has been seen.

The many other features of the invention will be readily observed without specific enumeration thereof. I therefore do not desire that my invention be limited by the preferred embodiment disclosed.

Having now described my invention, what I desire to secure by Letters Patent is:

1. A mobile, multiple-implement hitch adapted to be moved forwardly over the ground, comprising a relatively wide frame having opposite side portions, means on one side portion providing a first wheel journal on a fixed transverse axis; means on the other side portion providing a second wheel journal on a fixed transverse axis parallel to and offset fore and aft from the axis of the first wheel journal, first and second ground-engaging fixed-directional wheels rotatable respectively on the first and second journals and sustaining the frame, traction hitch means connected to the frame for application to the frame substantially centrally between the wheels of propelling power from a traction vehicle, and first and second implement hitch members connected to the frame in transversly spaced relation respectively closely adjacent to the first and second wheels, said members being of substantially equal length and symmetrically arranged in trailing relation to the respective wheels so as to provide first and second transversely spaced, implement hitch points offset fore and aft in accordance with the fore and aft offset of the first and second wheel journals each hitch member being of such length as to dispose its hitch point rearwardly beyond the rear part of the periphery of the associated wheel.

2. A mobile, multiple-implement hitch frame adapted to be moved forwardly over the ground, comprising an elongated main structural frame element positioned diagonally as respects the direction of travel, said frame element having projecting laterally outwardly at one end thereof as an angularly related extension thereof a first fixed axle means arranged normal to the direction of travel and projecting laterally outwardly at its other end as an angularly related extension thereof a second fixed axle means parallel to the first axle means but offset both transversely and fore and aft relative thereto because of the length and diagonal dispostion of the frame element, first and second wheels journaled for fixed-directional rotation respectively on the first and second axle means for sustaining the frame element, traction hitch means connected to the frame element intermediate the wheels for connecting the frame element to a traction vehicle, and first and second implement hitch members connected to the frame element respectively adjacent to the first and second wheels and extending respectively rearwardly beyond the peripheries of the adjacent wheels for individually connecting at least a pair of trailing implements to the frame element.

3. A multiple-implement hitch adapted to be drawn by a traction vehicle, comprising a relatively wide frame having opposite side portions, a first fixed-directional wheel journaled on the frame at one side portion thereof on a transverse axis, a second fixed-directional wheel journaled on the frame at the other side portion thereof on a transverse axis, first and second relatively widely spaced upright pivots on the frame respectively adjacent to the first and second wheels, first and second hitch members connected respectively to the first and second pivots and normally extending fore and aft to provide first and second hitch points respectively spaced fore and aft from the first and second pivots for individual towing connection to at least a pair of trailing implements, and first and second limit means cooperative between the frame and the respective hitch members to constrain the hitch members for angular movement about their respective pivots in such directions that the hitch points can move laterally outwardly only each limit means including a one-way stop element effective on the associated member from one side only of the member to establish a stop against inward swinging of the member but permitting free swinging of the member outwardly.

4. A mobile, multiple-implement hitch adapted to be moved forwardly over the ground, comprising a relatively wide frame having opposite side portions, means on one side portion providing a first wheel journal on a fixed transverse axis, means on the other side portion providing a second wheel journal on a fixed transverse axis parallel to and offset fore and aft from the axis of the first wheel journal, traction hitch means connected to the frame for application to the frame of propelling power from a traction vehicle, and first and second implement hitch members connected to the frame in transversely spaced relation respectively closely adjacent to the first and second journals, said members being of substantially equal length and symmetrically arranged in trailing relation to the respective journals so as to provide first and second transversely spaced implement hitch points offset fore and aft in accordance with the fore and aft offset of the first and second journals.

5. The invention of claim 4, including first and second pivot means on upright axes offset fore and aft on the order of the fore and aft offset of the first and second wheel journals and respectively connecting the implement hitch members to the frame for individual lateral swinging of said members relative to the frame, and first and second limit means cooperative between the frame and the members for limiting such lateral swinging of the members in such manner that the implement hitch points can swing laterally outwardly only each limit means including a one-way stop element effective on the associated member from one side only of the member to establish a stop against inward swinging of the member but permitting free swinging of the member outwardly.

6. A mobile, multiple-implement hitch frame adapted to be moved forwardly over the ground, comprising an elongated frame element positioned diagonally as respects the diretcion of travel, said frame element having projecting laterally outwardly at one end thereof as an angularly related extension thereof a first fixed axle means arranged normal to the direction of travel and projecting laterally outwardly thereof at its other end as an angularly related extension thereof a second fixed axle means parallel to the first axle means but offset both transversely and fore and aft relative thereto because of the length and diagonal disposition of the frame element, traction hitch means connected to the frame element for connecting the frame element to a traction vehicle, and first and second fore and aft extending implement hitch members connected at their front ends to the frame element respectively adjacent to the ends of the frame element and offset fore and aft according to the fore and aft offset of the axle means, said elements being of substantially equal length to dispose their rear ends in similar fore and aft offset relationship for individually connecting at least a pair of trailing implements to the frame element.

7. A multiple-implement hitch adapted to be drawn by a traction vehicle, comprising a relatively wide frame having opposite side portions, a first fixed axle on one side portion of the frame for journaling a fixed-directional wheel on a transverse axis, a second fixed axle on the other side portion of the frame for journaling another fixed-directional wheel on a transverse axis, first and second relatively widely spaced upright pivots on the frame respectively adjacent to the first and second wheel journals, first and second hitch members connected respectively to the first and second pivots and normally extending fore and aft to provide first and second hitch points respectively spaced fore and aft from the first and second pivots for individual towing connection to at least a pair of trailing implements, and first and second limit means cooperative between the frame and the respective hitch members to constrain the hitch members for angular movement about their respective pivots in such directions that the hitch points can move laterally outwardly only, each limit means including a one-way stop element effective on the associated member from one side only of the member to establish a stop against inward swinging of the member but permitting free swinging of the member outwardly.

8. A mobile implement frame adapted to be advanced over a field, comprising an elongated frame element arranged with its length diagonally to the line of advance and having opposite end portions, a draft element lying lengthwise of the line of advance and rigidly joined to the frame element midway between said opposite end portions, a first brace rigidly joined at one end to the draft element in fore and aft spaced relation to the junction of the draft and frame elements and rigidly joined at its other end to one end portion of the frame element, a second brace rigidly connected at one end to the draft element in transverse alinement with the junction of the draft element and the first brace and rigidly joined at its other end to the other end portion of the frame element, and first and second wheel journals joined respectively to the end portions of the frame element and respectively providing fixed, parallel, transverse wheel-journaling axes offset fore and aft because of the length and diagonal disposition of the frame element and adapted respectively to journal fixed-directional wheels as the sole mobile support of the frame.

9. The invention of claim 8, including a pair of supports rigidly joined to the frame element, one at and projecting horizontally and in a fore and aft direction from each end portion of said frame element, each support having a pivot on an upright axis and said supports being of equal length so that the pivots are offset fore and aft on the order of the fore-and-aft offsetting of the wheel-journaling axes, and a pair of implement hitch members connected respectively to the supports by said pivots and extending normally as laterally swingable fore-and-aft extensions of the supports, each member having its free end provided with an implement-hitching connection spaced fore and aft from the respective pivot and said members being of equal length so that the hitching connections have the same fore-and-aft offset as the pivots.

10. The invention of claim 9, including a pair of individual limit means respectively cooperative with the hitch members and the supports to constrain lateral swinging of the hitch members to such direction that the hitch connections can move laterally outwardly only each limit means including a one-way stop element effective on the associated member from one side only of the member to establish a stop against inward swinging of the member but permitting free swinging of the member outwardly.

11. A mobile, multiple-implement hitch adapted to be moved forwardly over the ground, comprising a relatively wide frame having opposite side portions, means on one side portion providing a first wheel journal on a fixed transverse axis; means on the other side portion providing a second wheel journal on a fixed transverse axis parallel to and offset fore and aft from the axis of the first wheel journal, first and second ground-engaging fixed-directional wheels rotatable respectively on the first and second journals and sustaining the frame, traction hitch means connected to the frame for application to the frame substantially centrally between the wheels of propelling power from a traction vehicle, first and second implement hitch members connected at their front ends to the frame on upright axes offset fore and aft on the order of the fore and aft offset of the first and second wheel journals and in transversely spaced relation respectively closely adjacent to the first and second wheels, said members being of substantially equal length and symmetrically arranged in trailing relation to the respective wheels so as to provide first and second transversely spaced, implement hitch points offset fore and aft in accordance with the fore and aft offset of the first and second wheel journals and individually laterally swingable relative to the frame, and first and second limit means cooperative between the frame and the members for limiting such lateral swinging of the members in such manner that the implement hitch points can swing laterally outwardly only, each limit means including a one-way stop element effective on the associated member from one side only of the member to establish a stop against inward swinging of the member but permitting free swinging of the member outwardly.

12. The invention of claim 11, including releasable retaining means for selectively locking at least one of the trailing hitch members against such laterally outward swinging.

13. The invention of claim 11, including releasable retaining means for selectively locking at least one of the trailing hitch members against return from a position in which it is swung laterally outwardly.

14. A mobile implement frame adapted to be advanced over a field and having opposite, outer side portions relatively widely spaced apart crosswise of the line of advance and offset fore and aft, said frame including an elongated member disposed diagonally of the line of advance and rigidly secured at its ends respectively to said outer side portions and rigidifying said frame against both horizontal and vertical flexure to maintain the positions of said outer side portions relative to each other, a pair of wheel journals, one at and rigid on each of said outer side portions and providing a wheel bearing on a substantially horizontal axis normal to the line of advance, said journals projecting laterally outwardly respectively in opposite directions substantially as angularly related continuations of the diagonal member and being arranged so that the axis of one is parallel to but offset ahead of the axis of the other, and said wheel journals being respectively adapted to carry rotatably on the axis thereof fixed-directional wheels as the sole mobile support of said frame, and rearwardly extending implement hitch members secured respectively to said outer side portions of the frame, said hitch members having rear ends offset fore and aft as the order of the fore and aft offset of the wheel journals.

References Cited in the file of this patent

UNITED STATES PATENTS

| 1,319,449 | Yearous | Oct. 21, 1919 |
| 1,636,802 | Bozard | July 26, 1927 |
| 1,797,660 | Hughes | Mar. 24, 1931 |
| 2,142,016 | Branch | Dec. 27, 1938 |
| 2,515,016 | McClintock | July 11, 1950 |
| 2,525,917 | Leighnor | Oct. 17, 1950 |
| 2,528,741 | Clark | Nov. 7, 1950 |
| 2,569,736 | Snyder | Oct. 2, 1951 |

FOREIGN PATENTS

| 481,041 | Germany | Aug. 13, 1929 |